United States Patent
Hagle et al.

(10) Patent No.: US 7,172,389 B2
(45) Date of Patent: Feb. 6, 2007

(54) METHOD FOR MAKING A REPAIRED TURBINE ENGINE STATIONARY VANE ASSEMBLY AND REPAIRED ASSEMBLY

(75) Inventors: Michael Philip Hagle, Mason, OH (US); Timothy Lee Siebert, Cincinnati, OH (US); Jeffrey John Reverman, Cincinnati, OH (US); Dana Leigh Ferguson, Cincinnati, OH (US); Gregory Matthew Ford, Norwood, OH (US)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 10/989,791

(22) Filed: Nov. 16, 2004

(65) Prior Publication Data

US 2006/0104810 A1 May 18, 2006

(51) Int. Cl.
*F01D 9/00* (2006.01)
(52) U.S. Cl. .............................. 415/209.2; 415/209.4; 415/215.1; 29/889.22
(58) Field of Classification Search ............ 415/189, 415/191, 209.2, 209.3, 209.4, 210.1, 211.2, 415/213.2, 215.1
See application file for complete search history.

(56) References Cited

U.S. PATENT DOCUMENTS

| | | | |
|---|---|---|---|
| 4,305,697 A * | 12/1981 | Cohen et al. ............ | 415/210.1 |
| 5,248,240 A * | 9/1993 | Correia ..................... | 415/209.1 |
| 5,756,993 A | 5/1998 | Yoshinari et al. | |
| 5,758,416 A | 6/1998 | Reverman et al. | |
| 6,354,797 B1 | 3/2002 | Heyward et al. | |
| 6,416,278 B1 * | 7/2002 | Caddell, Jr. et al. ........ | 415/191 |
| 6,685,431 B2 * | 2/2004 | Hiskes ..................... | 415/209.4 |
| 6,793,457 B2 | 9/2004 | Caddell et al. | |
| 6,905,308 B2 | 6/2005 | Hagle et al. | |
| 2003/0077171 A1 | 4/2003 | Hiskes | |

(Continued)

FOREIGN PATENT DOCUMENTS

EP     1176284 A2     1/2002

(Continued)

OTHER PUBLICATIONS

European Patent Office; Search Report; Reference No. 136495/11054 Application No. 05257022.3 -; Place of Search—The Hague; dated Jun. 23, 2006; 3 pgs.

*Primary Examiner*—Edward K. Look
*Assistant Examiner*—Devin Hanan
(74) *Attorney, Agent, or Firm*—William Scott Andes; Armstrong Teasdale LLP

(57) ABSTRACT

A method is provided for making a repaired turbine engine stationary vane assembly including at least one airfoil bonded between spaced apart first and second platforms. The method comprises providing a first vane assembly member including at least a portion of the first platform, the airfoil, and a first segment of the second platform bonded with the airfoil. Also provided is a second vane assembly member including a second segment of the second platform with a recess of a shape and size sufficient to receive the first segment of the second platform. The first segment is placed in the recess after which the first and second segments are bonded, for example by brazing or welding. Provided is a more structurally sound repaired turbine engine stationary vane assembly including the first and second vane assembly members bonded together.

8 Claims, 3 Drawing Sheets

U.S. PATENT DOCUMENTS

| | | |
|---|---|---|
| 2003/0106215 A1 | 6/2003 | Heyward et al. |
| 2004/0096322 A1 | 5/2004 | Caddell et al. |
| 2004/0096323 A1 | 5/2004 | Hagle et al. |

FOREIGN PATENT DOCUMENTS

| | | |
|---|---|---|
| EP | 1319802 A2 | 6/2003 |
| EP | 1419849 A1 | 5/2004 |
| EP | 1422381 A3 | 5/2004 |

* cited by examiner

US 7,172,389 B2

METHOD FOR MAKING A REPAIRED TURBINE ENGINE STATIONARY VANE ASSEMBLY AND REPAIRED ASSEMBLY

BACKGROUND OF THE INVENTION

This invention relates to the repair of turbine engine components, and, more particularly to the repair of a damaged gas turbine engine stationary vane assembly.

An example of a turbine engine stationary vane assembly typically subjected to excessive wear or damage during engine operation or damaged during manufacture is a stationary vane assembly in the hot operating turbine section of a gas turbine engine. Such an article, sometimes referred to as a turbine nozzle or turbine nozzle assembly, typically includes at least one airfoil as well as passages and openings for air cooling. In such engine location, the stationary vane assembly experiences high temperature, strenuous environmental conditions during engine service operation. As a result, damage can occur to the extent that repair or replacement of the assembly is required for safe, efficient operation. As is well known in the art, such air-cooled turbine components are relatively expensive to manufacture because they are complex in design and made of relatively expensive materials, for example high temperature superalloys. Therefore, it has been a practice to repair rather than to replace such a component.

Reports of methods and apparatus for repair of turbine engine stationary vane assemblies include U.S. Pat. No. 4,305,697—Cohen et al. (patented Dec. 15, 1981) and U.S. Pat. No. 5,758,416—Reverman et al. (patented Jun. 2, 1998). During the repair of such a turbine vane assembly, it is important to maintain the relative positions of assembly members such as the airfoils and the spaced-apart platforms between which the airfoils are secured. In one type of such repair, the inner and outer platforms and the airfoils first are disassembled for the repair and/or replacement of such individual members. In that repair, re-assembly of new or repaired members to provide a repaired assembly is similar to original manufacture of the vane assembly. It includes joining of the ends of individual airfoils to the spaced-apart platforms, for example by brazing or welding about airfoil end stubs, while all of such members are maintained in accurate relative positions. Such a repair can provide a number of joints with joint construction not originally designed into the article.

It is desirable to provide a method for making a repaired turbine engine stationary vane assembly that requires a reduced number of members, joints, and repair steps to result in a repaired assembly with enhanced structural integrity at the juncture of the airfoil and the platforms. Such feature particularly is important in the platform portion between airfoils in multiple airfoil vane assemblies.

BRIEF SUMMARY OF THE INVENTION

The present invention, in one form, provides a method for making a repaired turbine engine stationary vane assembly comprising first and second radially spaced apart platforms with at least one airfoil therebetween. The airfoil includes spaced apart first and second airfoil ends. The method provides a first vane assembly member that comprises at least a portion of the first platform bonded with the airfoil at the first airfoil end, and a second platform first segment having a first edge portion of a first selected peripheral shape bonded with the airfoil at the second airfoil end. Also provided is a second vane assembly member that comprises a second platform second segment including therein a first recess having a second edge portion substantially of the first selected peripheral shape and of a size sufficient to receive therein the second platform first segment to enable the first and second edge portions to be in juxtaposition. The second platform first segment is placed in the first recess of the second platform second segment with the first and edge portions in juxtaposition. Then the first and second vane assembly members are bonded about the first and second edge portions to provide a repaired turbine engine stationary vane assembly.

In another form, the present invention provides a repaired turbine engine stationary vane assembly including the members as described above. In such assembly, the first and second vane assembly members are bonded at the juxtaposed first and second edge portions.

DETAILED DESCRIPTION OF THE INVENTION

The present invention will be described in connection with one form of an axial flow gas turbine engine stationary turbine nozzle representing a typical stationary vane assembly. Such an engine comprises, in serial flow communication generally from forward to aft, one or more compressors, a combustion section, and one or more turbine sections disposed axisymmetrically about a longitudinal engine axis. Accordingly, as used herein, phrases using forms of the term "axial" or "axially", for example "axially forward" and "axially aft", refer to relative positions or general directions in respect to the engine axis; phrases using forms of the term "circumferential" refer to general circumferential position or direction generally about the engine axis; and phrases using forms of the term "radial", for example "radially away from", refer to relative radial position or direction generally from the engine axis.

Figure 1:
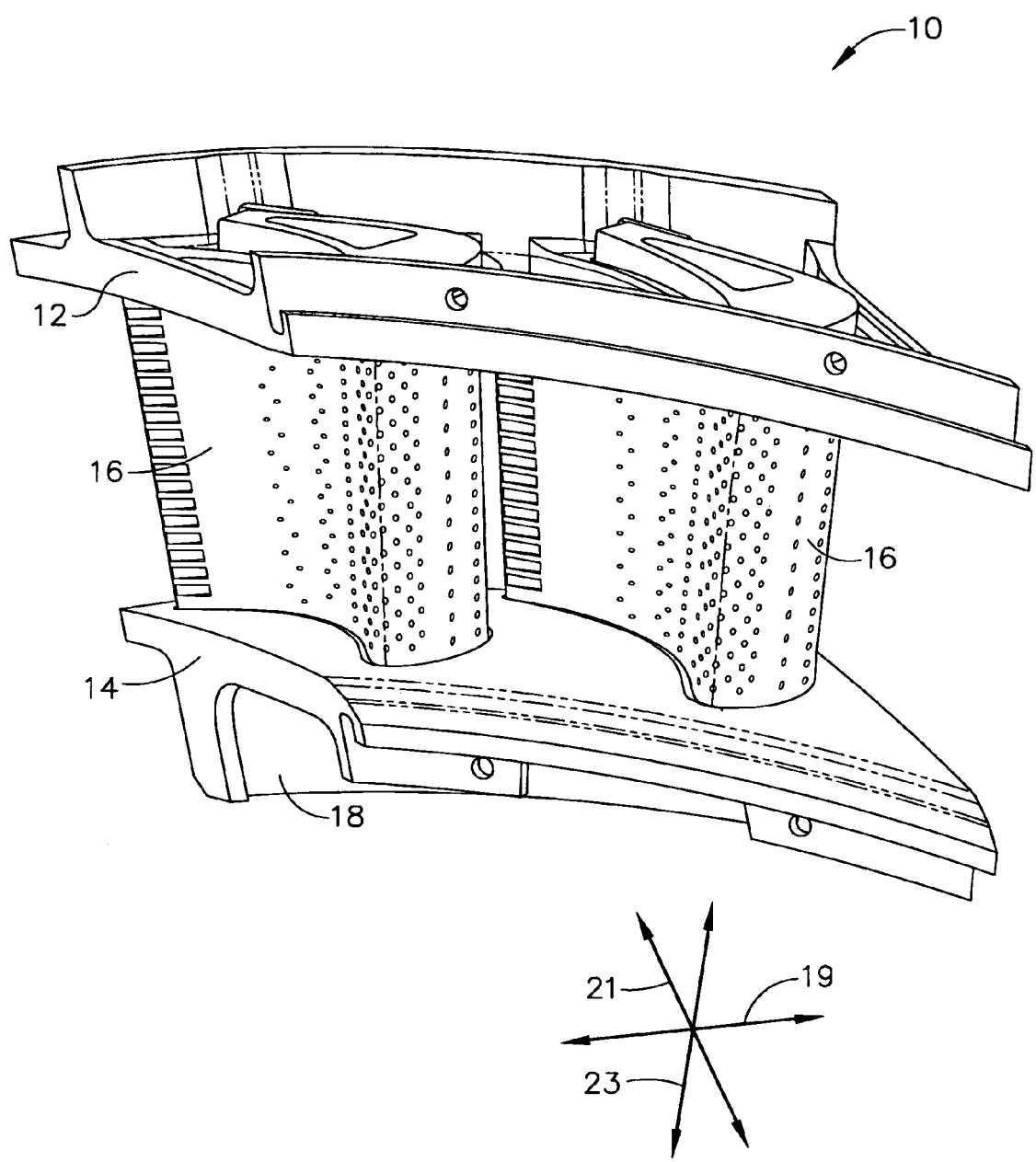
FIG. 1 is a perspective view of a typical gas turbine engine turbine stationary vane assembly.

One current method for repairing a damaged gas turbine engine turbine stationary nozzle or vane assembly, for example resulting from service operation, includes disassembly of the inner and outer platforms from the at least one airfoil disposed between the platforms. The perspective view of FIG. 1 shows a typical gas turbine engine stationary vane or nozzle assembly generally at 10. Stationary vane assembly 10 includes a first or outer platform 12, second or inner platform 14 spaced apart from first platform 12 and a plurality, in this embodiment two, airfoils 16 bonded between platforms 12 and 14.

Included in the embodiment of stationary turbine vane assembly 10 of FIG. 1 is a load stop protrusion 18 extending circumferentially 19 along an axially 21 aft portion of inner platform 14 and protruding generally radially 23 away from airfoils 16. Generally in original manufacture of inner platform 14, prior to its assembly into a turbine nozzle assembly, load stop protrusion 18 is precision cast as an integral part of platform 14. In this example, load stop protrusion 18 functions as a radially inner aft load carrying mounting portion for turbine nozzle assembly 10. As a result of being integral with inner platform 14 rather than a separate member bonded with inner platform 14, the junction between load stop 18 and inner platform 14 is more structurally capable of carrying mounting loads.

Figure 2:
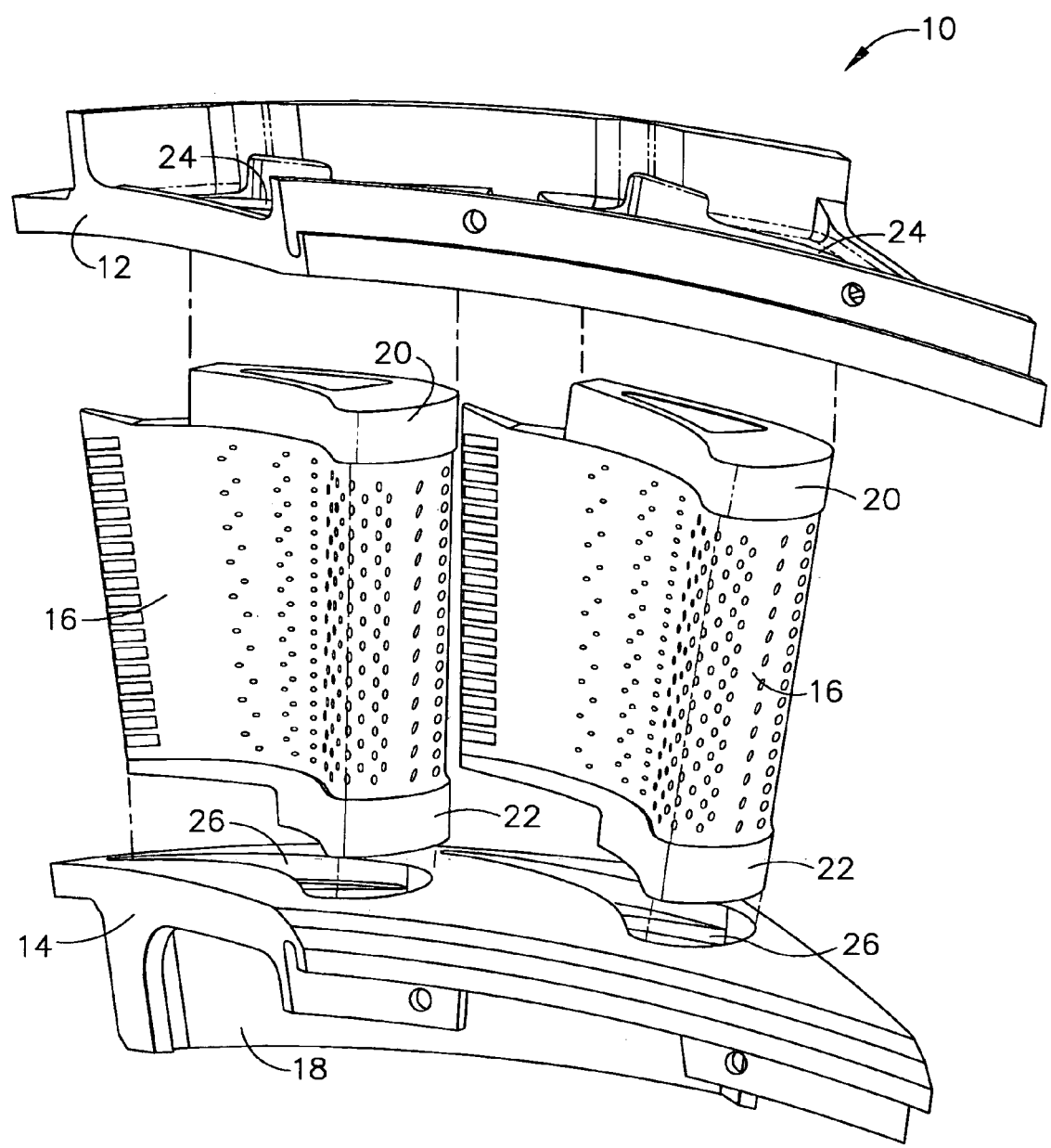
FIG. 2 is an exploded view of the vane assembly of FIG. 1 showing a prior art method of assembling vane members.

An exploded view of the members of turbine vane assembly 10 of FIG. 1 is shown in the perspective view of FIG. 2. During one prior art method for repairing a turbine engine vane assembly damaged during engine service operation, during manufacture, or otherwise, first or outer platform 12, second or inner platform 14 and airfoils 16 are disassembled. In the embodiment of FIG. 2, airfoils 16 include first airfoil stub ends 20 and second airfoil stub ends 22 that are disposed respectively in platform openings 24 and 26 for registry and bonding with and between platforms 12 and 14. After such disassembly, any damaged member is replaced with a new or repaired member and the article is reassembled for use. In this prior art example, at least four separated bonding joints are required, for example brazed or welded joints, while the four separate members are secured in relation to one another in accurate design positions. Such a repaired article using prior art methods can include joint construction not originally designed into the article.

One form of the present invention provides a method for making a repaired turbine engine stationary vane assembly using fewer distinct members and therefore fewer bonded joints, and lower repair time and cost. In addition, the present invention enables inclusion of integral, new, replacement material including load stop protrusion 18. As a result, the repaired turbine engine vane assembly associated with the present invention has enhanced load carrying structural stability.

Figure 3:
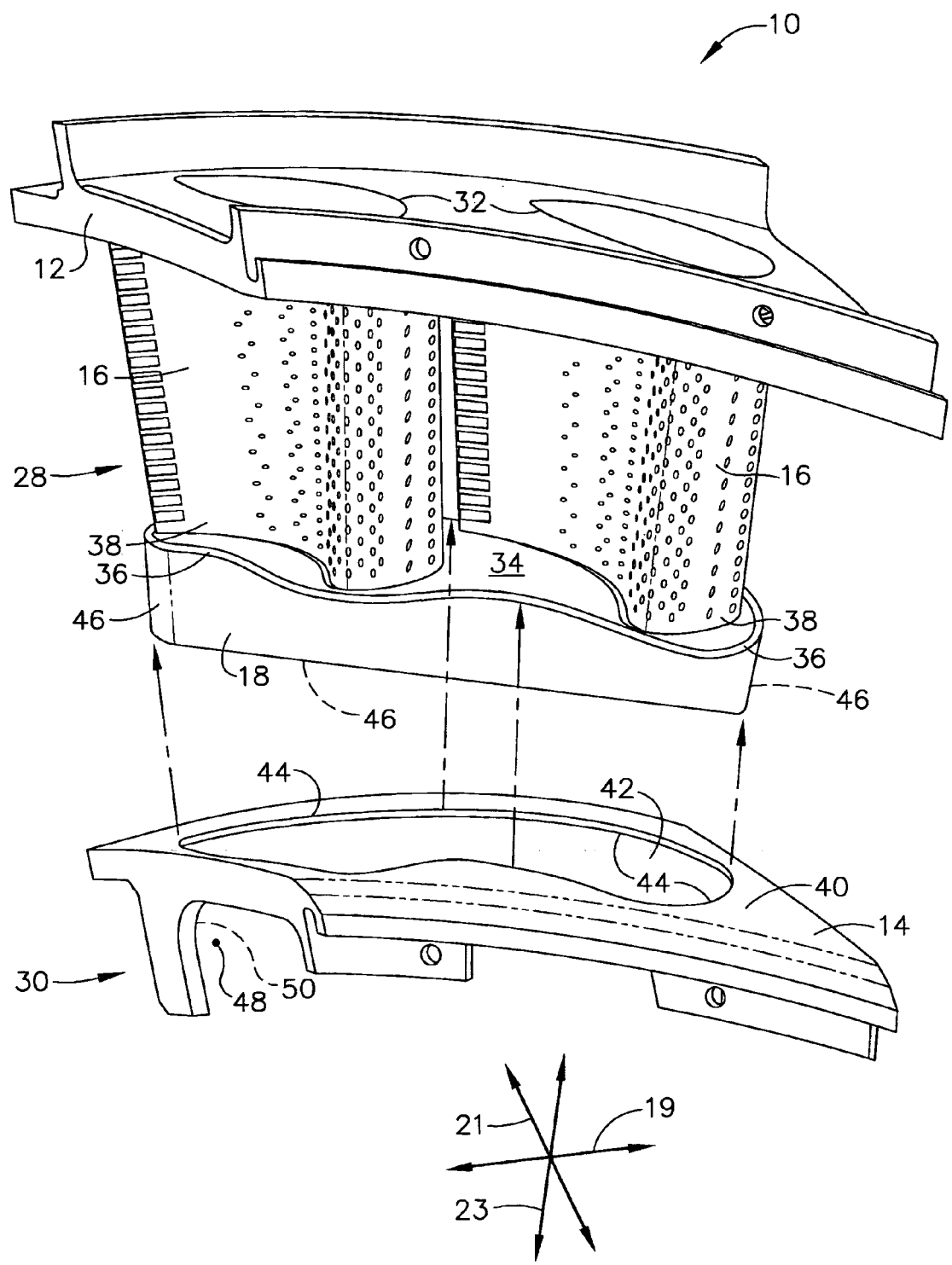
FIG. 3 is an exploded view of an embodiment of a repaired turbine engine stationary vane assembly associated with the present invention.

The perspective, exploded view of FIG. 3 shows members used in connection with a form of the present invention. A first vane assembly member is shown generally at 28 and a second vane assembly member is shown generally at 30.

First vane assembly member 28 comprises at least a portion, in this example all, of a first or outer platform 12 bonded with at least one airfoil 16 at first airfoil end 32 which need not necessarily include a stub end as airfoil stub end 20 in FIG. 2. First vane assembly member 28 also comprises a second platform first segment 34 having a first edge portion 36 of a selected peripheral shape. Segment 34 is bonded with airfoil 16 at a second airfoil end 38 which also need not necessarily include a stub end as airfoil stub end 22 in FIG. 2.

Second vane assembly member 30, sometimes referred to as a "window frame" inner band or platform, comprises a second platform second segment 40 including therein a first recess 42 defined by a second edge portion 44 substantially of the selected peripheral shape of first edge portion 36. First recess 42 is of a size sufficient to receive therein second platform first segment 34 to enable first edge portion 36 and second edge portion 44 to be in juxtaposition when segment 34 is in first recess 42.

In the embodiment of FIG. 3, first vane assembly member 28 includes load stop protrusion 18 extending circumferentially 19 along second platform first segment 34 and radially 23 away from airfoils 16. During engine operation, aerodynamic loading is on airfoils 16, and must be transferred through load stop protrusion 18 to engine structure supporting turbine vane assembly 10. By including load stop protrusion 18 on first assembly member 28 according to a form of the present invention, an additional repair joint is avoided, and the aerodynamic load does not pass through a repair joint that can have a construction not originally designed into turbine vane assembly 10. Load stop protrusion 18 has a protrusion edge portion 46 of a second peripheral shape. In that embodiment, second vane assembly member 30 includes a second recess 48 having a second recess edge portion 50 substantially of the second peripheral shape. Second recess 48 is of a size sufficient to receive therein load stop protrusion 18 to enable protrusion edge portion 46 and second recess edge portion 50 to be in juxtaposition when protrusion 18 is in second recess 48.

First and/or second vane assembly members 28 and 30, respectively, can be provided as new members or as useful portions salvaged from previously manufactured turbine vane assemblies. Because the bonded joints existing in such salvaged portions had been accurately controlled during original manufacture, such portions include joint construction originally designed into the article. When first and/or second vane assembly members 28 and/or 30 are provided as new members, improved replacement material can be included to enhance features such as the structural stability and operating life of turbine vane assembly 10. Reducing the number of repair bonded joints, according to forms of the present invention, provides an article easier to produce and structurally more stable and complete through its load carrying portions.

In one form of the method of the present invention, second platform first segment 34 of first vane assembly member 28 is placed in first recess 42 of second vane assembly member 30 with first and second edge portions 36 and 44 in juxtaposition. Then the first and second vane assemblies 28 and 30 are bonded about the first and second edge portions 36 and 44, for example by brazing or welding, to provide a repaired turbine engine vane assembly 10.

In the embodiment of FIG. 3, the method includes, in addition, placing load stop protrusion 18 of first vane assembly member 28 in second recess 48 of second vane assembly member 30 with protrusion edge portion 46 and second recess edge portion 50 in juxtaposition. Then the edge portions 46 and 50 are bonded, for example by brazing or welding, to provide the repaired turbine engine vane assembly 10.

The present invention has been described in connection with specific embodiments, structures, and methods. However, it will be understood that they are intended to be typical and representative of rather than in any way limiting on the scope of the present invention. Those skilled in the various arts involved, for example relating to turbine engines and their design, construction and repair, will understand that the invention is capable of variations and modifications without departing from the scope of the appended claims.

What is claimed is:

1. A method for making a repaired turbine engine stationary vane assembly comprising a first platform, a second platform radially spaced apart from the first platform, and a plurality of airfoils therebetween, the plurality of airfoils each including a first airfoil end and a second airfoil end spaced-apart from the first airfoil end, comprising the steps of:

providing a first vane assembly member including at least a portion of the first platform bonded with the plurality of airfoils at the first airfoil ends, and a second platform first segment having a first edge portion of a first selected peripheral shape bonded with the plurality of airfoils at the second airfoil ends and including material of the second platform between the plurality of airfoils;

providing a second vane assembly member comprising a second platform second segment including therein a first recess having a second edge portion substantially of the first selected peripheral shape and of a size sufficient to receive therein the second platform first segment to enable the first and second edge portions to be in juxtaposition;

placing the second platform first segment of the first vane assembly member in the first recess of the second platform second segment of the second vane assembly member with the first and second edge portions in juxtaposition; and then, bonding the first vane assembly member and the second vane assembly member about the first and second edge portions to provide a repaired turbine engine vane assembly.

2. The method of claim 1 in which the first platform is a radially outer platform of the vane assembly, and the second platform is a radially inner platform of the vane assembly.

3. The method of claim 1 in which the second platform first segment and the second platform second segment together define the second platform.

4. The method of claim 1 in which:

the second platform first segment includes a load stop protrusion extending circumferentially along the second platform first segment and radially away from the plurality of airfoils, the load stop protrusion having a protrusion edge portion of a second selected peripheral shape;

the second platform second segment includes a second recess having a second recess edge portion substantially of the second peripheral shape and of a size sufficient to receive therein the load stop protrusion to enable the protrusion edge portion and the second recess edge portion to be in juxtaposition;

placing the second platform first segment of the first vane assembly member in the first recess of the second platform second segment of the second vane assembly member with the first and second edge portions in juxtaposition and the protrusion edge portion and the second recess edge portion in juxtaposition; and then, bonding the first vane assembly member and the second vane assembly member about the first and second edge portions and about the protrusion edge portion and second recess edge portion to provide a repaired turbine engine vane assembly.

5. A repaired turbine engine stationary vane assembly comprising a first platform, a second platform radially spaced apart from the first platform, and a plurality of airfoils therebetween, the plurality of airfoils each including a first airfoil end and a second airfoil end spaced-apart from the first airfoil end, comprising:

a first vane assembly member comprising at least a portion of the first platform bonded with the plurality of airfoils at the first airfoil ends and a second platform first segment bonded with the plurality of airfoils at the second airfoil ends and including material of the second platform between the plurality of airfoils, the second platform first segment further including a first edge portion; and, a second vane assembly member comprising a second platform second segment including therein a first recess having a second edge portion;

the second platform second segment being located in the first recess with the first edge portion of the second platform first segment bonded with second edge portion of the second platform second segment to comprise the second platform.

6. The vane assembly of claim 5 in which the first platform is a radially outer platform of the vane assembly, and the second platform is a radially inner platform of the vane assembly.

7. The vane assembly of claim 5 in which the second platform first segment and the second platform second segment together define the second platform.

8. The vane assembly of claim 5 in which:

the first vane assembly member includes a load stop protrusion extending circumferentially along the second platform first segment and radially away from the plurality of airfoils, the load stop protrusion having a protrusion edge portion;

the second vane assembly member includes a second recess having a second recess edge portion;

the load stop protrusion is located in the second recess with the protrusion edge portion of the first vane assembly member bonded with second recess edge portion of the second platform second segment.

* * * * *